United States Patent [19]

Rotival

[11] Patent Number: 4,924,312

[45] Date of Patent: May 8, 1990

[54] DEVICE FOR ENSURING THE TELEVISION COMPATABILITY OF PICTURE SENSORS WITH OPTOMECHANICAL ANALYSIS

[75] Inventor: Jacques Rotival, Vanves, France

[73] Assignee: U.S. Philips Corp., New York, N.Y.

[21] Appl. No.: 181,298

[22] Filed: Apr. 14, 1988

[30] Foreign Application Priority Data

Apr. 17, 1987 [FR] France ................................. 87 05527

[51] Int. Cl.$^5$ ........................ H04N 11/20; H04N 7/01; H04N 5/14
[52] U.S. Cl. .................................... 358/140; 358/160; 358/11
[58] Field of Search .................. 358/11, 140, 160, 180, 358/188, 22

[56] References Cited

U.S. PATENT DOCUMENTS

| | | | |
|---|---|---|---|
| 4,386,367 | 5/1983 | Peterson et al. | 358/140 |
| 4,500,908 | 2/1985 | Mandeberg | 358/11 |
| 4,567,506 | 1/1986 | Shinoda et al. | 358/140 |
| 4,719,508 | 1/1988 | Sasaki et al. | 358/11 |
| 4,739,405 | 4/1988 | Sumida | 358/140 |

FOREIGN PATENT DOCUMENTS 1482789 8/1977 United Kingdom .

*Primary Examiner*—John K. Peng
*Attorney, Agent, or Firm*—William L. Botjer

[57] ABSTRACT

Arranged downstreams of a camera (1) for the serial or parallel-serial analysis of a field of view, the device comprises a digitizing device A/D (2) which serially supplies samples which are coded in parallel over p bits, a digital-to-analog converter D/A (3) and a monitor TV (4). According to the invention, the device furthermore includes, arranged between the A/D (2) and the D/A (3) a line memory (11) comprising an integral number N of lines, which serves as a buffer memory between the lines entering at the variable rate of the optomechanical analysis lines and the lines outputted at the fixed rate of the TV lines. The number N is chosen to be substantially equal to the instantaneous maximum possible shift of the number of lines between the analysis and their recovery. A picture clock pulse generator supplies the synchronizing signals, of the TV standard, necesssary for the analyser of the camera and for the line memory. Use: picture sensors with optomechanical analysis.

5 Claims, 6 Drawing Sheets

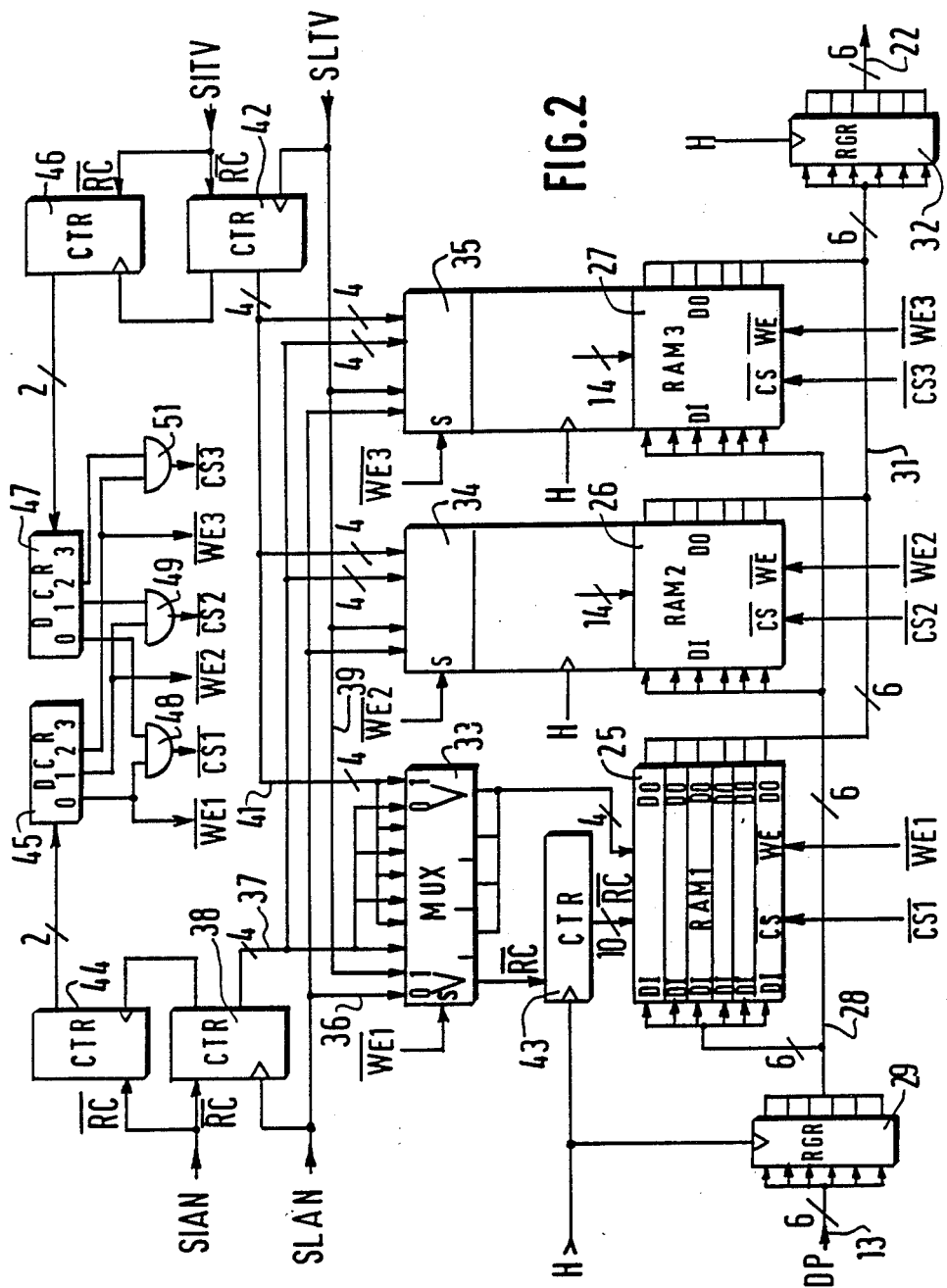

# DEVICE FOR ENSURING THE TELEVISION COMPATABILITY OF PICTURE SENSORS WITH OPTOMECHANICAL ANALYSIS

BACKGROUND OF THE INVENTION

The invention relates to a device for ensuring the television compatability of picture sensors operating with opto mechanical analysis, said analysis being effected by the analyser of a camera using a serial or parallel-serial scanning of a field of view, comprising a digital device which serially supplies in digital form samples which are representative of elements of the field of view analyzed in chronological sequence, each sampled element being coded in p bits in parallel and a digital-to-analog converter, and also to display means in a television monitor (TV monitor) of the output signal of said digital-to-analog converter.

Said optomechanical analysis picture sensors to which the invention relates comprise mobile optical elements such as moving mirrors or rotating drums with mirrors, which are characterized by a high operating speed in the field and line scan and by a non-negligible associated inertia, which prevents their automatic positional control. To reproduce the picture thus analysed of a field of view, a TV monitor is used at present whose rates, that is to say whose field and line scanning frequencies are supplied by the analyser itself. This mode of operation has two drawbacks:

In the first place, the imperfections in the acquisition of the picture, which are caused by the mechanical sweeps, the latter having intrinsically slow response times, are retransmitted in their totality to the screen of the TV monitor; more specifically a fluctuation in the line synchronization, contractions or expansions of the picture because of angular velocities of the camera are concerned. On the other hand, it is desirable, especially for the sake of standardization, that it is possible to supply a picture signal of a precisely defined TV standard, for example the CCIR TV standard, instead of a TV signal whose standard is closely connected to one type or another of optomechanical analysis, and for which more specifically the line rates are not of TV standards. Obviating these two drawbacks forms at the same time a technical problem which the invention has for its object to resolve and for that purpose has for its aim to restore on a TV screen an improved picture which satisfies a TV standard.

The invention relates to cameras utilizing serial or parallel-serial scans, excluding cameras using parallel scanning, the preferred scanning mode being the parallel-serial scanning which, compared with serial scanning renders it possible, when scanning identical pictures or fields, to divide the rate of the line scan device by m, which reduces the line synchronization problems and renders it possible to use less fast photodetectors, by using a m times higher number of these photodetectors. When parallel-serial scanning is applied, the analog output signals of the camera are distributed in parallel over m conductors and a known and even conventional manner is to position, just downstream of the camera, a digital device which has also for its function to effect a scanning conversion, that is to say a conversion in the serial form of the picture lines in accordance with a chronological sequence which corresponds to the spatial sequence of the lines of the field of vision. Thus a serial line scan is obtained, the elements themselves being analysed serially in each line. Irrespective of the fact whether the scanning operation is effected in the serial or in the parallel-serial form, a sequence of digital samples in the serial form is then obtained at the output of the digital device, each sample being representative of an element, coded in parallel over p bits. In this request it should be noted that the number m does not occur to make the invention effective nor to optimize its embodiments, all this occurring as if the digital device is integrated in the camera and in all these cases a serial scan being concerned. In accordance with the known technique, the output signal of the digital member can be applied to the TV monitor after having been converted by a digital-to-analog converter and, optionally via a digital processing module in which different types of filtering operations or processing operations such as concatenation, convolution or the elimination of the background of a scene can be effected. In accordance with this technique, the above-mentioned imperfections in the picture on the TV monitor continue, particularly the fluctuations in the line synchronization which is caused by faults in the sensor of the line analyser and various parasitics such as electrical or mechanical disturbances, dust or other causes. On the other hand, the total number of lines per picture is generally equal to a multiple k of m for the case of an analysis on bands having m lines, for example: $k \times m = 57 \times 11 = 627$ lines; finally the line and field synchronizations are imperfect because of moves by the carrier of the camera. The above-mentioned imperfections cannot be corrected for principle reasons or because of technological limitations.

A known mode of operation consists in giving the analyser a picture frequency which is identical to that of the TV receiver used, and the standard of the latter. This mode of operation is known from, for example, United Kingdom Patent Specification GB 1,482,789 but which is used in a technical field which differs from that of the invention, for a camera using parallel analysis, that is to say a field in which the line synchronization is not a problem. It will be noted that furthermore in this known technique a memory must be provided whose capacity is higher than or equal to a field to ensure the conversion of the standard searched, that is to say several hundreds of lines, which in the state of the art is complicated and expensive and introduces a considerable delay between the analysis and the display.

SUMMARY OF THE INVENTION

It is an object of the invention to ensure the strict television compatibility of picture sensors with optomechanical parallel-serial or serial analysis.

A further object of the invention is to improve the stability of the picture recovered on the screeen of a TV monitor when a conversion of the standard between an optomechanical analyser and a TV monitor to a TV standard is necessary.

These objects are accomplished and the drawbacks of the prior art are obviated or suppressed because of the fact that the device defined in the opening paragraph, is characterized in that it furthermore includes a combination of on the one hand, arranged between said digital device and said digital-to-analog converter a line memory containing at least N lines, N being an integer, and designed to receive the picture elements of the field of view at first line rate of the optomechanical analysis and to supply these elements to said TV monitor at a second TV line rate irrespective of the fluctuations, which vary` versus time, between these respective rates, these fluctuations being such that the instantaneous shift between the analysis and the recovery on the TV monitor varies with a maximum of N lines, and on the other hand a picture clock generator which applies synchronizing signals of the same frequency to said analyser and to said line memory and also line and element synchronizing signals at a TV standard to said line memory.

The basic idea of the invention is to disconnect the output of the digital-to-analog converter from the analyser. The scan conversion module is then not only limited to the single digital device but may comprise two blocks:

an input block, constituted by the actual digitizing device, which acquires the video in synchronism with the analysis, an output block transmitting said same video in synchronism with a TV time base, for example, compatible CCIR.

These two time bases evidence fluctuations versus time relative to each other; it is then necessary to have an additional system available, in the present case a line memory (read-only memory) of an adequate capacity and which is appropriately addressed which renders it possible for the video to follow the same fluctuations whose mean value must be zero in the long term. Two embodiments are described hereinafter which have for their object to optimize these line memories as regards cost, bulk and/or delay time, that is to say to minimize the capacity or the addressing of this memory by using as much as possible cheap memories of a type which is commercially available on a large scale, preferably random access memories.

Such a memory could be realised b means of components of the commercially available first in-first out (FIFO) type but the required capacitance, although low and reduced to some dozens of lines, requires a large number of expensive components. In contrast thereto, the solutions proposed allow the use of RAM memories which are commercially available on a large scale.

A first embodiment of the device according to the invention, is characterized in that said line memory is constituted by 3 random-access memory blocks of N lines each, and that it furthermore comprises for the addressing of said RAM memory line and analysis element counters, and a counter for counting N analysis lines connected to a first analysis decoder, TV line and picture element counters, and a counter counting N TV lines which is connected to a second TV decoder, a logic circuit to apply, on the basis of said first and second decoders, write-read and circuit selection control signals to said line memory blocks and multiplexers which are controlled by said write-read signals to transfer to said blocks the addresses formed by the output signals of at least said line counters.

The object chosen here is to read or write an optional block at a given instant, the possibility of simultaneously writing or reading several lines in the same block being excluded. In the circumstances it should be realised that making 2 blocks of N lines each available is insufficient, but that 3 blocks of N lines are sufficient to constitute the line memory.

A second embodiment of the device is characterized in that it comprises a random-access line memory reduced to N lines and divided into p blocks, an input register for the analysis elements formed by P serial-parallel converters, at the rate of one converter per analysing element bit, whose capacity is equal to q bits, q being a power of two, an output register for the TV standard element constituted by p parallel-serial converters each having a capacity of q bits, a memory block whose capacity expressed in a number of lines is equal to N/P being connected to each input and output register, an analysis element and TV element counter, respectively and a counter for the analysis lines or TV lines, respectively, said counters applying from their multiple output, via a multiplexer, the write address signals or read address signals, respectively, to each one of p memory blocks, and a basic clock pulse generator which applies the adequate control signals to said registers, memory blocks, multiplexers and line counters.

In this second embodiment, the alternate writing and reading of a single RAM memory block of N lines is enabled, at the rate of one line period, which renders it possible to divide the capacity of the memory by 3 with respect to the first embodiment.

Preferably, the rates of the elements at the output of the digital device $F_{pA}$, at the input of the TV monitor $F_{pTV}$ and at the input and output of the line memories are equal, for said two embodiments, to the rate of the TV elements, to simplify the device. This is rendered possible because of the degree of freedom which the digital device allows, the time efficiency of the TV line scan being less than 100%, (for example 52 $\mu$s instead of 64 $\mu$s).

BRIEF DESCRIPTION OF THE DRAWING

The following description which is given by way of example with reference to the accompanying drawings, will make it better understood how the invention can be put into effect.

FIG. 2 is the block circuit diagram of a first embodiment of the line memory of the device according to the invention.

DESCRIPTION OF THE PREFERRED EMBODIMENT

Figure 1:
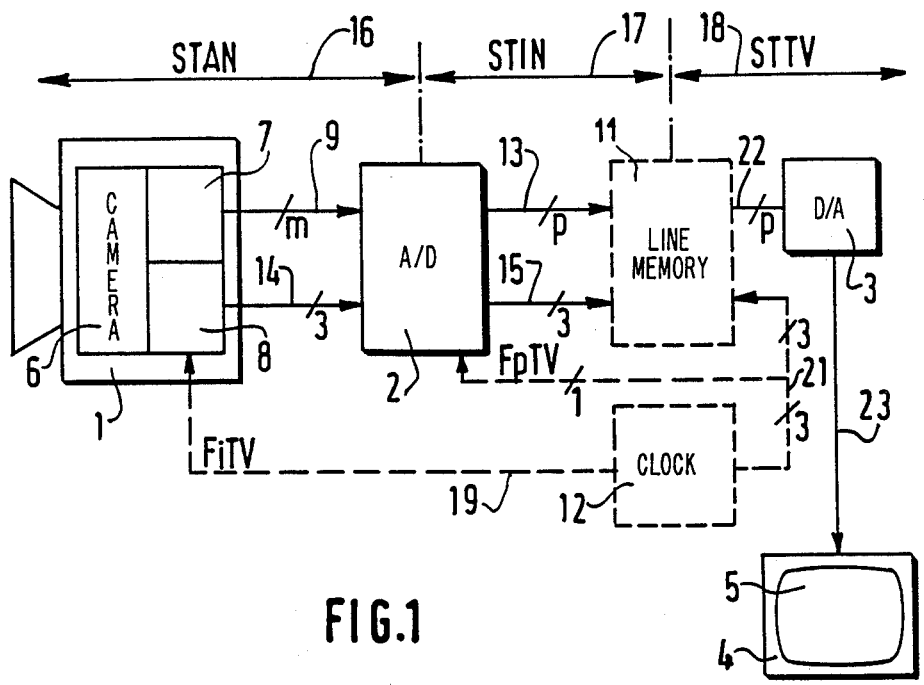
FIG. 1 is a general block circuit diagram to explain the basic principle of the invention.

A system using optomechanical analysis in a field of view with recovery of the picture of the field on a television screen such as shown in FIG. 1 comprises, arranged in cascade, at least the following elements: a camera 1, a scan converter limited to a digital device 2 which itself includes an analog-to-digital converter and memories a digital-to-analog converter 3 and a TV monitor 4 having a screen 5.

The camera 1 comprises a scanning module 6, a detector unit 7 and an electronic scanning circuit 8, the assembly of the elements 6, 7 and 8 constituting an analyser. The scanning module is preceded by an objective, not shown, and includes as the principle components on optical field scanning element, for example for two interlaced fields and an optical line scanning element. The analysis can be effected line-sequentially, in which case the analog video signal at the output of the camera 1 is carried by a sole conductor 9, or by bands of m lines and in that case the conductor 9, which is a multiple conductor comprises m single conductors. The camera operates in accordance with a standard appropriate for it, correspondiong to a television sub-standard, characterized by the picture frequencies $F_{iA}$, and the line frequency $F_{1A}$. By way of example, let the following values be assumed:

$F_{iA} = 25$ Hz $F_{1A} = 15675$ Hz i.e. 627 line periods per picture from which 510 consecutive line periods coincide with the analysis of the 510 useful lines.

$F_{pA} = 15$ MHz i.e. 957 picture element periods per line from which 780 consecutive picture element periods coincide with 780 useful picture elements.

The TV monitor 4 itself functions in accordance with a TV standard which is characterized by picture frequencies $F_{iTV}$, line frequencies $F_{1TV}$ and picture elements $F_{pTV}$. This standard is, for example, the TV CCIR standard having two interlaced fields, at a field frequency of 50 Hz, that is to say a picture frequency: $F_{iTV} = 25$ Hz. The other frequencies to be considered are as follows:

$F_{1TV} = 15625$ Hz i.e. 625 line periods per picture from which 510 consecutive line periods coincide with the display of 510 useful lines.

$F_{pTV} = 15$ MHz i.e. 960 picture element periods per line from which 780 consecutive picture element preiods coincide with the display of 780 useful elements.

It should be noted that the average useful information output on analysis and on recovery on the screen 4 is the same as according to the invention, which forms an implicit starting hypothesis for putting it into effect. In this stage, there are two problems to be resolved: in the first place, the values of the field and line frequencies of the two standards are different. Moreover, because of the fact that the two frequencies of the analysis standard are ruled by mechanical members, they are both subjected to fluctuations relative to the homologous frequencies of the TV standard which may be considered as fixed frequencies, the latter frequencies in comparison, being generated electronically. For example, during a sudden rotational acceleration of the camera 1 of the order of $1000°/s^2$ a picture analysis period may be increased or reduced by 6 line periods, i.e. a variation in the picture frequency $F_{iA}$ of the order of 1%, the frequency $F_{1A}$ also being modified in comparable proportions. According to the invention, the two standards are rendered compatible by interposing between the digitizing device 2 and the digital-to-analog converter 3, a line memory 11 containing an integral number N of lines, and on the other hand a clock generator 12.

The digitizing device 2 converts the analog serial or parallel signal it received from the camera 1 into a serial digital signal, for example distributed over 6 bits (p bits) on a multiple conductor 13, which represents 64 different5 possible contrast levels. This digital signal is transferred by the conductor 13 to the line memory 11, at the picture element frequency.

The picture and line synchronizations are represented in FIG. 1 by the dual conductor 14 between the elements 1 and 2 and by the dual conductor 15 between the elements 2 and 11. An arrow 16 opposite the conductor 14 symbolises the portion of the device governed by the analysis standard STAN, an arrow 17 opposite the conductor 15 symbolises the portion of the device governed by an intermediate standard STIN which is near to the analysis standard and an arrow 18 symbolises the remaining portion of the device governed by the precisely defined television standard STTV.

The clock generator 12 applies to the electronic scanning circuit 8, via a conductor 19, synchronizing pulses at the picture frequency $F_{iTV}$, the scanning module being automatically controlled, which implies that: $F_{iA} = F_{iTV}$, and picture, line and picture element synchronising pulses to the lilne memory via a triple conductor 21 at the frequencies $F_{iTV}$, $F_{1TV}$ and $F_{pTV}$, respectively. A phase shift corresponding to some line periods or to some dozens of line periods must be introduced between the picture drive signals on the conductors 19 and 21, in the form of an advance of the drive of the analyser, intended to compensate for the average time necessary for the buffering action of the line memory 11. The line memory 11 applies via a multiple conductor 22 a signal of the TV standard to the digital-to-analog converter 3 as regards its line and picture frequencies. As there is no digital television system, this signal is thereafter conveyed in the analog form to the TV monitor 4 via a conductor 23.

In a manner known per se, the electronic scanning circuit 8 has its frequency controlled to the picture frequency $F_{iA}$ it receives, in the present case equal to $F_{iTV}$, with a certain dynamic error, such that the picture synchronizing signal on the conductor 14 has a frequency whose mean value is equal to $F_{iTV}$, whilst as regards the instantaneous value it will be noted that there are leading or lagging phase shifts equivalent to several line periods, namely: ±u line periods at a maximum.

This instantaneous random phase shift is caused by the high response time of said control, caused by mechanical members included in this control link. A further systematic deviation of v line periods which is caused by the deviation in line frequency between the two standards STAN and STTV is added to this first phase shift. In order to render the two standards STAN and STTV compatible, the time variations between the analysis picture synchronizing pulses on the one hand and the TV pulses on the other hand, which may vary by must be taken into consideration:

$$2 + v \leq N \text{ line periods} \quad (1)$$

Thus the capacity of the line memory 11 is defined, which capacity must at least be equal to N lines (N being an integer).

This results, for example, in that for u=6 and v=2, N=16 lines. The low value of N compared with the capacity of a 255 line field memory will be obvious.

Given the fact that the analysis is assumed to be effected chronologically and as the recovery of the picture on the screen 5, when a mode of operation by interlaced fields or a picture-sequential mode of operation is concerned, the memory 11 to be considered is, as regards its general operating principle, of the very simple first in-first out (FIFO) type. It is moreover possible to realise the memory 11 by means of commercially available FIFO components, because of its capacity of N picture lines, but, although low, this required capacity results in a large number of these expensive components. The solutions in accordance with the two embodiments described hereinafter with reference to the FIGS. 2 to 7 allow in contrast thereto the use of random-access memorieds (RAM) which are commercially available on a large scale, which entails the necessity of addressiong whose complexity is however not inhibiting.

In this stage of putting the invention, whose general principle has been disclosed above, into effect, the first notion is to write at a first line rate a N line block of the RAM memory and to read this block at a second line rate. Now, writing and reading a RAM memory simultaneously is impossible, from the technological point of view. It is therefore possible that, for example, a plurality of N-line blocks must be considered, in such manner, that during the time a block is written, another block is read. To have two blocks of N lines available is still insufficient because of said fluctuations. Therefore the memory 11 must have at least three blocks of N lines, considered from the above point of view. The above reasoning may be generalized because of the fact that the memory blocks may each contaoin a number of lines less than N, provided their number is consequently increased. The starting criterion that there is no dependence between writing and reading the RAM memory blocks associated with a possible fluctuation of N lines between writing and reading results in a structure of the memory block 11 of P blocks of X lines each, such that:

$$(P-3)X < N \leq (P-2)X \qquad (2)$$

wherein
$X \leq N$
$P \geq 3$

Figure 3:
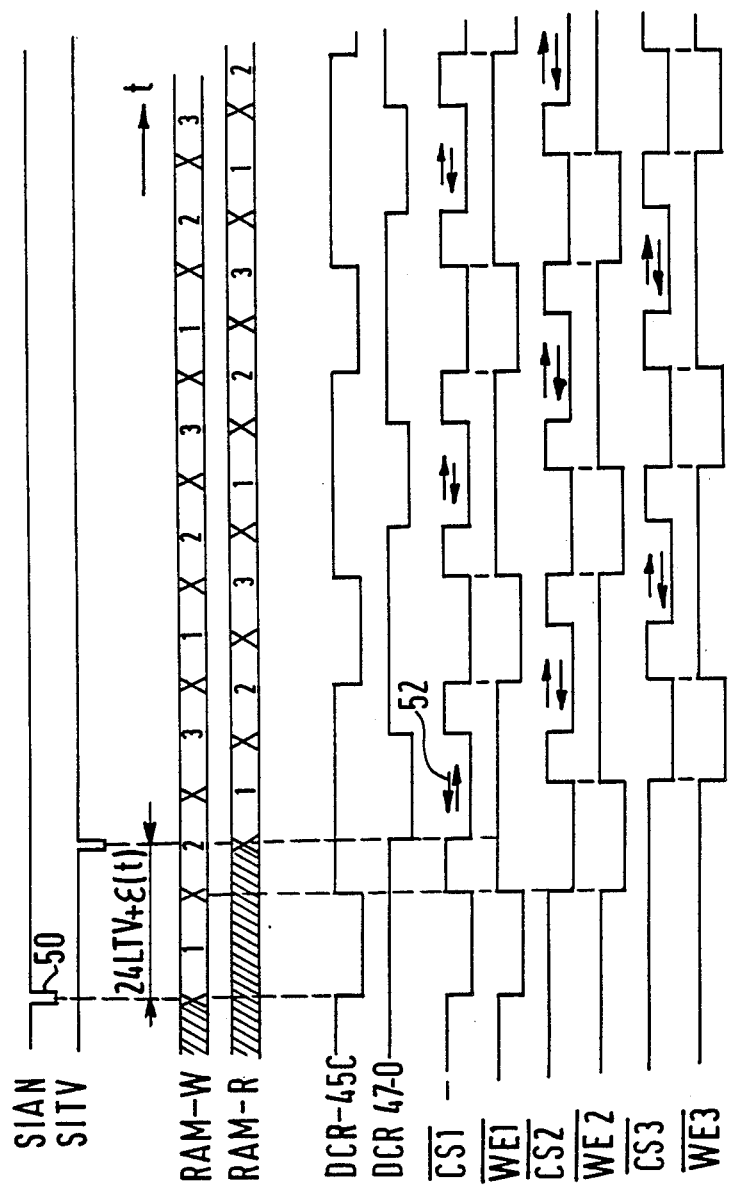
FIG. 3 shows time diagrams showing the generation of control signals of the 3 line memory blocks of the first embodiment of FIG. 2.
Figure 4:
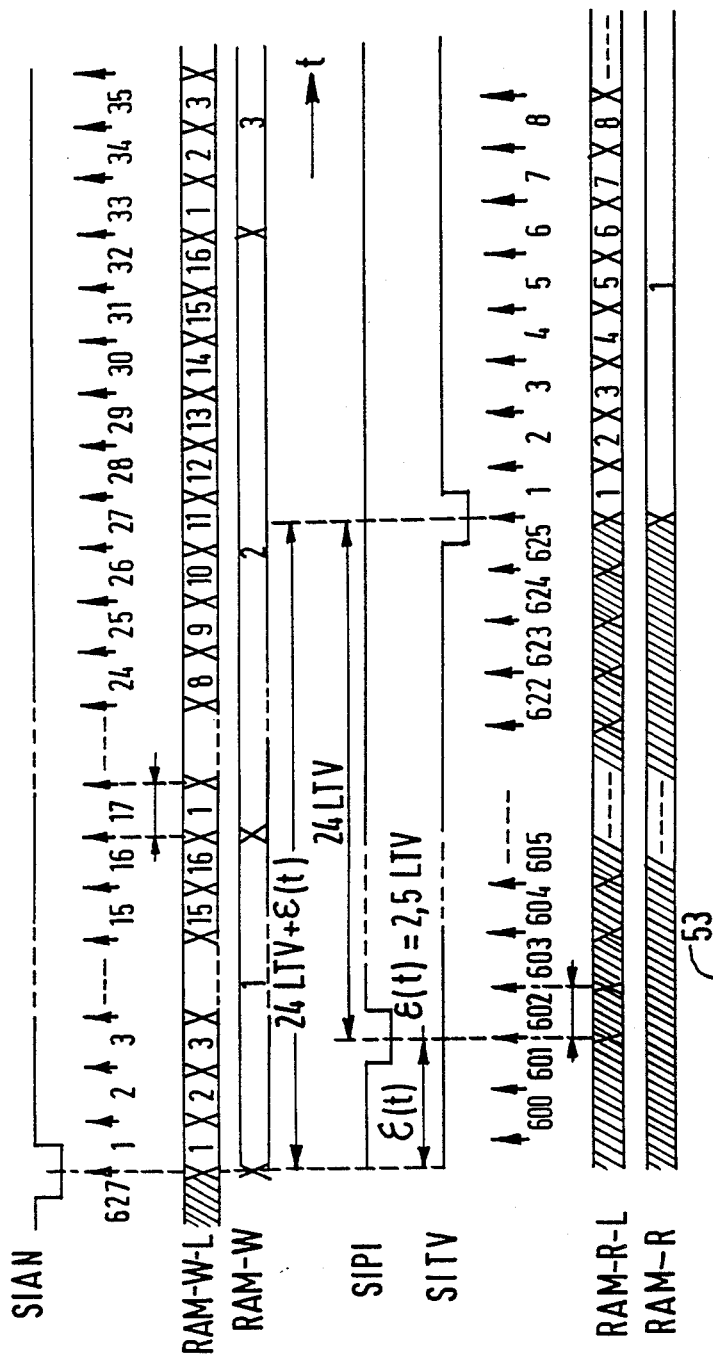
FIG. 4 shows time diagrams illustrating how the picture and line synchronization are effected in accordance with the first embodiment of FIG. 2.

The solution reserved for the first embodiment of the FIGS. 2, 3, 4, namely: P=3 and X=N is the solution for which addressing of the memories is in its most simple form, the complexity of the addressing operation increasing versus the increasing number P of blocks. It is also the solution for which the compacting of the line memory 11 is best also for this solution, for which reason this solution is preferred. However, if the first selection criterion is the price, instead of a small bulk, solutions for which $X < N$ and $P > 3$ are preferably chosen. It should be noted that actually the capacity of the memory decreases when X decreases: for example 4 blocks of 8 lines have an overall capacity of 32 lines, whilst 3 blocks of 16 lines represent a total of 48 lines. Ultimately, the extreme solution of P=N+2 blocks each having one line for which the capacity of the memory 11 is at its minimum (N+2) is obtained and managing the address may be considerably more-complicated and which would only be justifiable for large scale production of the device and if there is no restriction on the volume. An appropriate choice results in practice in a compromise as a function of the components used.

FIG. 2 shows the structure of a first embodiment of the line memory 11 intended for the device according to the invention. This structure is predominantly formed by three identical RAM memory blocks, i.e. the block 1, 25, the block 2,26 and the block 3,27. Each block, which has a capacity which is at least equal to 16 lines is organized in the form of 16 K words of 6 bits, each element being encoded in parallel over 6 bits. To that end, each block has a six fold data input DI and a six fold data output DO; it is addressed by 14 conductors which can supply 16 K different addresses, for example because there are 4 conductors for line addressing and 10 conductors for addressing the picture elements in each line. Each block which functions, for example, in negative logics has furthermore a circuit selection input $\overline{CS}$ and a write-read input $\overline{WE}$. The RAM memories used are, for example, memories IDT 6167 having an access time of 45 ns. The data inputs of the three blocks are connected to a common6-conductor bus 28 coming from an input register 29 having 6 parallel bits and, symmetrically, the data output of the three blocks are connected to a common 6-conductor bus 31 which feeds an output register 32 having 6 parallel bits (p=6). At their clock inputs, the registrs 29 and 32 receive the synchronising signal H of the picture elements at the frequency of the TV standard for the elements. Addressing the lines is effected from line and picture synchronizing signals, namely the signals SLAN and SIAN in the write mode and the signals SLTV and SITV in the read mode. Since the same conductors are used during reading and writing for the memory blocks 25, 26 and 27, the respective multiplexers 33, 34, 35 are used for switching either the signals originating from the signal SLAN or the signals originating from the signals SLTV to the address inputs of the blocks. Each multiplexer receives at a selection input S a signal WE1 (WE2, WE3, respectively) which is identical to the signal WE1 (WE2, WE3) applied to each input WE of each memory block 25, 26 or 27. The inputs of each multiplexer from the signal SLAN, that is to say the inputs intended for the write addresses are formed by a first input 36 which directly receives the signal SLAN at the analysis line frequency and by a four-fold input 37 which receives the signal from a 4-bit modulo-16 counter 38, which is incremented by the signal SLAN and is initialised by the picture synchronizing pulses, that is to say the pulses of the signal SIAN. In a similar manner, the inputs of the multiplexer from the signal SLTV that is to say the inputs intended for the read addresses are formed by a first input 39 which directly receives the signals SLTV at the TV line frequency and by a four-fold input 41 which receives the signal from a modulo-16 counter (4 bits) 42, incremented by the pulses of the signal SLTV and initialised by the pulses of the signal SITV. Addressing the picture elements in each line is effected, for each memory, via a counter 43 which is incremented by the signal H which has the frequency of the elements of the TV standard used in that case, irrespective of the fact whether it is effected in the write or in the read mode, and is initialised by either the signal SLAN in the write mode or by the signal SLTV in the read mode. The counter 43 is a 10-bit counter, which is sufficient for counting the elements of a line. The counters 43 are, for example, of the type HC 163 which forms part of the HCMOS memory. This conception for the addressing of the elements in each line allows the dimension of the multiplexers 33, 34, 35 to be reduced to 5 output bits.

It is alternatively possible, by way of variation, to combine the counting of the elements in view of the addressing operation with the counters 48 and 42, which would reduce the number of element counters from P to 2; in contradistinction thereto, the dimension of the multiplexers will be increased, changing from 5 to 14 output bits in the example of FIG. 2.

To have the line memory of FIG. 2 function properly, a logic allowing the generation of the circuit selection signals CS1, CS2, CS3 and read-write signals WE1, WE2, WE3 is also necessary. As also for the generation of the addresses the six logic signals mentioned first are generated from the synchronizoing signals SLAN and SIAN. To this effect, the circuit of FIG. 2 includes on the one hand a counter referred to as the logic analysing counter 44 and a logic analysing decoder 45 and also a logic counter TV 46 and a logic decoder TV 47. The elements 44 and 46 are 2-bit counters which are incremented by the most significant output bits of the fourfold conductor 37 (41, respectively) and initialised by the pulses of the signal SIAN (SITV, respectively). The counters 44 and 46 are arranged as three-state dividers such that the decoders 45 and 47, which receive their output signal on a dual conductor, supply from their three first outputs referenced 0, 1, 2 the signals shown in FIG. 3. As regards, for example, the logic decoder 45, the outputs 0, 1, 2 generate the respective signals WE1, WE2, WE3. The signal CS1 (CS2, CS3, respectively) is obtained at the output of an AND gate circuit 48 (49, 51, respectively) whose inputs are connected to the outputs 0 (1, 2, respectively) of the logic decoders 45 and 47. It should be noted that the output signals of the decoders 45 and 47 are identical as regards their period which is equal to 3 N line periods and their duty cycle which is equal to 0.33. The three output signals of one specific decoder have their phases shifted relative to each other by N or 2 N line periods.

FIG. 3 is an example of the shape and function versus time of certain signals and certain sequences of the circuit of FIG. 2. The Figure shows the signals SIAN and SITV which are phase-shifted relative to each other, denoted: 24 LTV+$\epsilon$(t), i.e. a nominal phase shift through 24 TV line periods plus the parasitic phase shift $\epsilon$(t) which can be corrected by the measures of the invention. In FIG. 3 the specific case is chosen in which: $\epsilon$(t)=0. The sequences RAM-W and RAM-R indicate the order in which the memory blocks RAM 25, 26 and 27 are written or read, respectively. It should be noted that a forward or backward shift of the pulse 50 of the signal SIAN not exceeding 8 line periods, which is symbolically indicated by the inverted arrows 52, renders it possible for the read or write operation of the memory blocks to be effected without overlap, which can be obtained under the control of the signals CS1, WE1, CS2, WE2, CS3, WE3. The signals CS1 and WE1, for example, are obtained from the signals DCR45-O (output 0 of the decoder 45) and DCR47-O (output 0 of the decoder 47): the signal WE1 is identical to the signal DCR45-O and the signal CS1 is moreover obtained from the logic function:

FIG. 4 shows, at a larger scale than in FIG. 3 and with time contraction, time diagrams by means of which it is possible to explain the mode of operation of the first embodiment of the invention. In FIG. 1 there are also shown the signals SIAN and SITV with a mutual phase shift of 24 TV line periods plus 2.5 TV line periods ($\epsilon$(t)=2.5 LTV). The signal SPI is the pilot picture synchronizing signal on the conductor 19, see FIG. 1. Also the sequences RAM-W and RAM-R with the corresponding line sequences RAM-W-L and RAM-R-L are shown. The write sequence of the analysis lines taken from the start of the analysed picture, that is to say from 1 to 627 is shown above the sequence RAM-W-L. Similarly, at the start of the sequence RAM-R-L, the read sequence of the TV lines taken from the start of the TV picture, i.e. from 1 to 625 is shown. An arrow 53 indicates for the sequences RAM-R and RAM-R-L, that there is no reading during the field retrace (or TV picture).

Because of the fact that it is impossible to read and write a RAM memory simultaneously, an other basic idea for the realisation of the line memory 11 consists in considering writing and reading of the picture elements in consecutive packets of consecutive elements, each packet containing the same number q of elements (except possibly the last packet of each line which may contain between 1 and q elements), the number q being preferably a multiple of 2 and preferably equal to 8. This implies that the bits which appear serially on each of the p conductors forming part of the multiple conductor 13, see FIG. 1, must be in the parallel form of q bits by q bits, this parallel shaping being effected in an input converter of the line memory 11. After having being stored in the memory and, ultimately, that is to say several line periods later, after reading of a given packet of q elements in the same memory block, this packet is converted from its parallel form into the serial form at the TV frequency of the picture elements, by an output converter of the line memory 11. The conversion in the parallel form of the picture elements is rendered necessary by the high frequency $F_{pTV}$, which is for example equal to 15 MHz, i.e. an element period of 66.6 ns, this period being comparable to the access time of currently used RAM memories. It should be noted that for still faster RAM memories and/or still higher element periods, it is not necessary anymore to put the picture elements in the parallel form.

Figure 5:
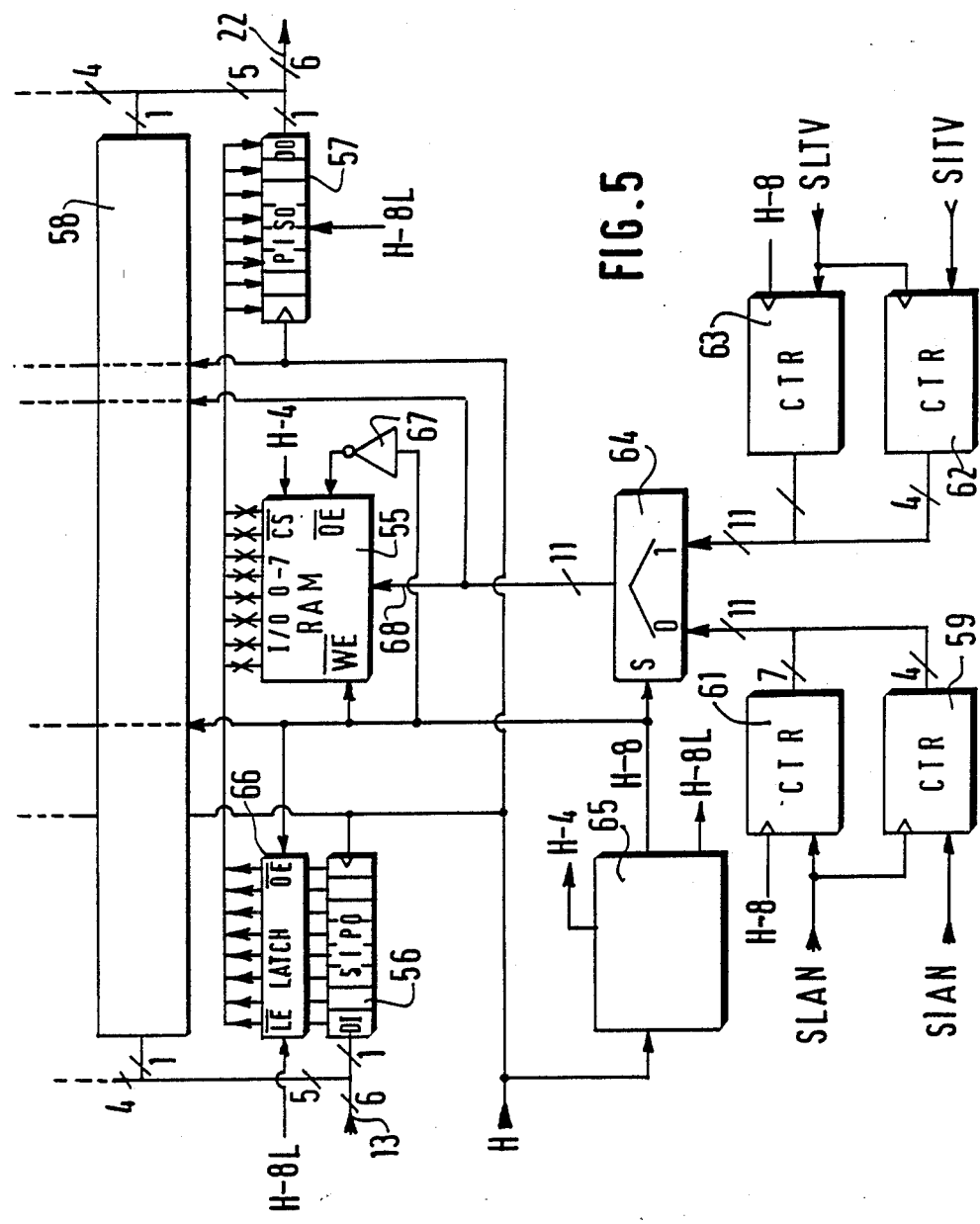
FIG. 5 is the block circuit diagram of a second embodiment of the line memory of the device of the invention.

For the technique described in the preceding paragraph, a RAM memory assembly totalling the capacity of the N picture lines is sufficient. This assembly is constituted by p blocks of 2K bytes, at the rate of one block per sampling bit of the picture elements of a given order. In FIG. 5, one block of these 6 RAM memory blocks is shown with reference numeral 55 and with an input converter 56 and an output converter 57; these three elements constituting a first sub-assembly. The picture memory 11 comprises p-1 (that is to say 5) further sub-assemblies which are identical to the first one and of which one, (which is the only one shown), is symbolised by the rectangle 58 and which receive the same control and address signals as the first sub-assembly, only the data inputs and outputs on a conductor for each sub-assembly being different. The lower part of FIG. 5 shows the counters 59 and 61 intended for addressing and writing analysed picture lines and packets of q analysis elements of the counters 62 and 63, respectively for addressing and writing TV picture lines and packets of q TV picture elements respectively. A multiplexer 64 receives 11 first signals from the counters 59 and 61 on the one hand and 11 second signals from the counters 62 and 63 on the other hand. A clock pulse base generator 65 receives the synchronizing signal H of the picture elements at the frequency of the TV standard for the elements (square-wave signal) and from its output supplies the signals H-4, H-8 and H-8L shown, and also the signal H in FIG. 6. The signal H-4 (the signal H-8, respectively) is a square-wave signal having a period which is four times (eight times, respectively) that of the signal H, the signal H-4 showing a slight lead relative to the signal H-8. The signal H-8L has the same frequency as the signal H-8, is in phase opposition with the latter and its duty cycle is equal to $\frac{1}{8}$. A write-read cycle is effected in eight picture element periods, which is in agreement with the time necessary to fill the converter 56 or to empty the converter 57, respectively. The converter 56, which has a serial input and a parallel output (SIPO) receives the data bit DI which propagates to the right at the rate of the picture elements under the control of the signal H at its clock input. The converter SIPO 56 is, for example, a HC595 provided with an input latch 66. When the SIPO has been filled, its content is transferred in less than one picture element period in the latch 66 under the control of the signal H-8L in the logic state "0" to an input $\overline{LE}$ ("latch enable"), whilst the output of the latch is inhibited by the signal H-8 in the "1" state at an input $\overline{OE}$ ("output enable"). The information contained in the latch 66 will be entered into the memory block 55 during the four picture element periods subsequent thereto. To that effect the signal H-8 at the write-read input $\overline{WE}$ of the memory 55 changes to the "0" state and simultaneously the input $\overline{OE}$, which receives the signal H-8 converted into H-8 by the inverter 67 is inhibited. Moreover, to allow a correct change-over of the addresses in the write mode, the selection input of the circuit $\overline{CS}$ receives the signal H-4 which must be in the "1" state during the negative transition of the signal H-8. To that end, an order establishing period of several dozens of nanoseconds corresponding to a slight advance of the signal H-4 is respected. It should be noted that the exterior control of the input $\overline{CS}$ is here used to reduce the memory occupation. To write the memory 55, the multiplexer 64 selects the 4 output signals of the counter 59 plus the 7 outputs of the counter 61 under the control of the signal H-8 in the "0" state at its input S. Similar to the counter 38 of FIG. 2, the analysis line counter 59 is initialized by pulses of the signal SIAN and is incremented by the pulses of the signal SLAN. In a similar manner, the eight-element packet counter 61 is triggered by the pulses of the signal SLAN and is incremented by the pulses of the signal H-8. The write addresses at the address input 68 of each block RAM 55 thus follow each other for the 8-element analysis packets in accordance with the same chronological sequence as the correct spatial sequence of the analysis line elements.

When, subsequently, the signal H-4 changes to "0" at the input $\overline{CS}$ of the memory, the input $\overline{OE}$ of the latch 66 being the seat of the "0" state, the information contained in the latch is transferred to the memory location addressed by the input 68 of the memory and, after two picture element periods, the signal H-4 changes again to the "1" state, which again blocks the memory in the write and the read mode. Approximately 30 ns later, the signal H-8 changes also to the "1" state, which presets the memory 55 and the multiplexer 64 in the read mode for the 4 picture element periods which follow. The time previous to reading is determined with a sufficiently long duration to ensure that the address access time in the read mode TAA is respected. The duration TAA is of the order of 2 to 3 element periods and it is, for example, possible to utilise static CMOS RAM 2K×8 memories having an access time of 120 ns. Addressing in the read mode is effected in the same way as described in the foregoing for the write mode, by substituting the counters 62 and 63 for the counters 59 and 61 and the signals SITV and SLTV for the signals SIAN and SLAN. Counting the picture element packets is also effected under the control of the signal H-8 at the incrementing input of the counter 63. During elapsing of the duration of the TAA, the signal H-4 changes against to the "0" state and thereafter, after the duration TAA has ended, also the signal H-8L changes to the "0" state, at the load input of the output converter PISO 57. The information obtained by the addressing operation on the conductor 68 is then transmitted in parallel in less than one picture element period from its memory location in 54 to the converter PISO 57 which, during this period, has ended outputting its previous information (s+4) via the output conductor 22. The converter 57 is, for example, of the type PISO HC 166. It should be noted that during the same element period the latch 76 receives a new packet of 8 information bits of 8 consecutive elements. Thereafter the write and read cycle starts again.

Figure 6:
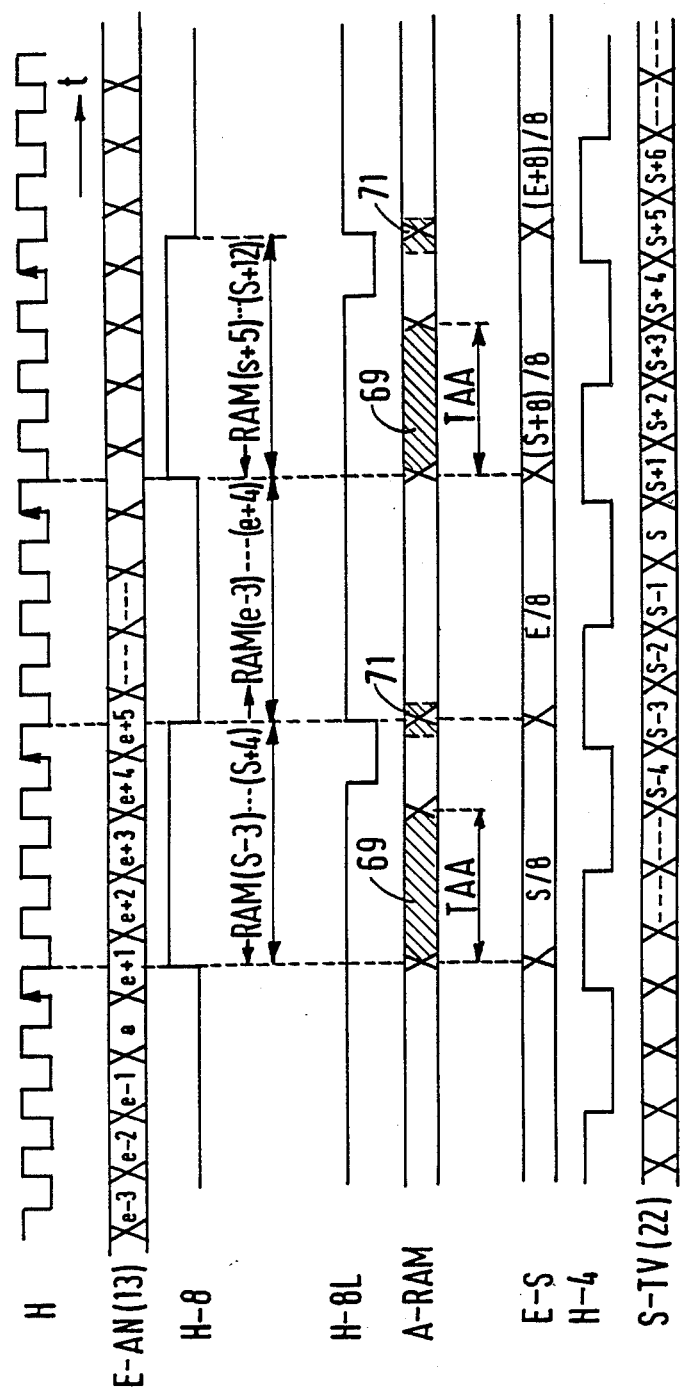
FIG. 6 shows time diagrams illustrating the generation and the action of the control signals for the N-line memory in the second embodiment shown in FIG. 5.

In FIG. 6 a sequence of elements to be written into the memory is shown, denoted E-AN and constituted by elements: e±i and also a sequence of elements to be read, denoted S-TV and constituted by elements to be read s±j. For three half-cycles of the signal H-8 the p eight-bit packets to be entered (→RAM) or to be read (←RAM) alternately are indicated. This alternating mode of operation is also represented by the sequence E-S where the 8 element packets to be read and to be written-in are shown in the respective forms: S/8, E/8, (S+8)/8, (E+8)/8, ... FIG. 6 also shows in a A-RAM sequence in which there are illustrated in accordance with hatched zones the setting period of the data of the p RAM memories the zones 69 for the reading operation of a duration TAA and the zones 71 for the writing operation, of a duration which is distinctly less than TAA.

Figure 7:
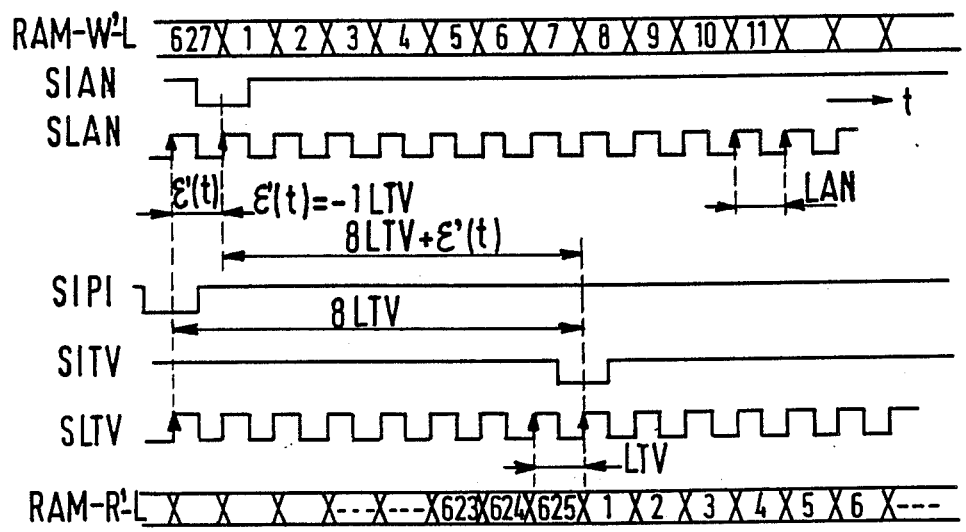
FIG. 7 shows time diagrams, similar to those of FIG. 4, for the second embodiment of FIG. 5.

FIG. 7 is a second time diagram, at the same scale as the line periods, homologous to the diagram of FIG. 4, by means of which it is possible to explain the mode of operation of the circuit of FIG. 5. As in FIG. 4, the signals SIAN and SITV are shown, but with a mutual phase shift through 8 line periods TV less a line period TV($\epsilon(t)$)=−1 LTV). In this second embodiment the nominal phase shift between the picture synchronizing signals TV and the reference picture synchronizing signal SIPI, is recuced to one third of the phase shift for the first mode, for the same reason as the required memory capacity. The signals SLAN and SLTV which are, for example, square-wave signals, and are active via their leading edges, are represented with, opposite thereto, the corresponding line sequences, RAM-W'-L for writing the analysis lines and RAM-R'-L for reading the lines TV.

The invention is not strictly limited to the embodiments described in the foregoing. Still maintaining the technique of the second embodiment in particular, it is possible to utilize bytes whose number of bits differs from eight. Utilizing, for example, four-bit bytes would result in 4K×4 bit memories which should operate at a twice faster rate, the frequency of the write-read cycle then being double; the capacity of the input and output converters would be reduced by half and the element counters 61 and 63 would have to comprise eight output bits instead of 7. For frequencies of elements higher than 30 MHz one should, in contradistinction, consider blocks of RAM memories organised in 1K×16 bits, when these blocks are commercially available. For the two above-described embodiments, different element frequencies $F_{pA}$ and $F_{pTV}$ may be contemplated, in contrast to what has been indicated in FIG. 1. To ensure that the above-described device will function correctly, it would then be necessary to include in the processing chain between the elements 2 and 11 and in the region of the conductor 13, a memory of the FIFO type (not shown) having a capacity of one picture line and which receives the picture elements at the frequency $F_{pA}$ and supplies them at the frequency $F_{pTV}$.

What is claimed is:

1. A device for ensuring the video compatability of picture sensors operating optomechanical analysis, said analysis being effected by the analyser of a camera using a serial or parallel-serial scanning of a field of view, comprising a digital device which serially supplies in digital form samples which are representative of elements of the field of view analysed in a chronological sequence, each sampled element being coded in p bits in parallel and a digital-to-analog converter, and also wherein the improvement comprises: a combination of, arranged between said digital device and said digital-to-analog converter, a line RAM memory containing at least N lines, N being an integer, said line memory being constituted by P blocks of X lines, P and X being integers such that:

$$(P-3)X < N \leq (P-2)X$$

wherein $$X \leq N \text{ and } P \geq 3$$

and designed to receive the picture elements of the field of view at a first line rate and opto mechanical analysis elements and to supply these elements to said video monitor at a second video line rate irrespective of the fluctuations, which vary versus time, between these respective rates, these fluctuations being such that the instantaneous shift between the analysis and the recovery on the video monitor varies with a maximum of N lines, and a picture clock generator which applies picture synchronizing signals of the same frequency to said analyser and to said line memory and also line and element synchronizing signals at a video standard to said line memory.

2. A device for ensuring the video compatibility as claimed in claim 1, wherein said device includes a random-access line memory reduced to N lines and distributed over p blocks, and analysis element input register formed by p series parallel converters, one converter per analysis element bit, whose capacity is equal to q bits, q being a power of two, an element output register at the video standard formed by p parallel series converters each having a capacity of q bits, a memory block whose capacity taken in the number of lines is equal to N/p being connected to each input and output register, a counter for counting the analysis elements and the video elements, respectively, and a counter for counting the analysis lines and the video lines, respectively, said counters supplying at their multiple output via a multiplexer, the write address signals and the read address signals, respectively to each one of the p memory blocks, and a basic clock pulse generator which applies the appropriate control signals to said registers, block memories, multiplexer and line counters.

3. A device for ensuring the video compatability as claimed in claim 1, wherein the rates of the elements at the output of said digitizing device, at the input of said video monitor and at the input and output of said line memory are equal to the sampled element rate.

4. A device for ensuring the video compatibility including an input register for the analysis elements and an output, register for the elements of the video standard, as claimed in claim 1, wherein X=N and P=3, and that said device further includes line counters and analysis elements, for addressing said RAM memory and a counter for counting N analysis lines connected to a first analysis decoder, line video picture element counters, and a counter counting N video lines connected to a second video decoder, a logic circuit for supplying on the basis of said first and second decoders write-read control signals and circuit selection control signals to said P line memory blocks and multiplexers controlled by said write-read signals for transferring to said P blocks the addresses constituted by the output signals of at least said line counters.

5. A device for ensuring the video compatibility, as claimed in claim 4, wherein the count of said analysis element and video picture counters coincides, one counter for each block of line memories, i.e. P counters which are each arranged between said block and a multiplexer associated with said block.

* * * * *